United States Patent [19]

Nagao

[11] Patent Number: 5,604,661
[45] Date of Patent: Feb. 18, 1997

[54] STRUCTURE FOR MOUNTING SWITCH OR THE LIKE TO ELECTRIC APPARATUS

[75] Inventor: Hiroshi Nagao, Kawasaki, Japan

[73] Assignee: Fujitsu Limited, Kawasaki, Japan

[21] Appl. No.: 513,234

[22] Filed: Aug. 10, 1995

[30] Foreign Application Priority Data

Dec. 28, 1994 [JP] Japan ................... 6-326623

[51] Int. Cl.$^6$ ................................ H02B 1/04
[52] U.S. Cl. ................... 361/643; 24/296; 200/295; 248/27.3; 248/505; 361/809
[58] Field of Search .................. 24/293, 294, 296; 200/294, 295, 296; 248/27.1, 27.3, 316.7, 505, 510, 560; 267/150, 160; 361/600, 627, 631, 643, 644, 647, 652, 673, 807, 809; 411/516, 530

[56] References Cited

U.S. PATENT DOCUMENTS

| 4,051,916 | 10/1977 | Oda .................... 180/90 |
| 4,398,073 | 8/1983 | Botz .................... 200/295 |
| 4,712,162 | 12/1987 | Quioque .................... 361/417 |
| 4,988,553 | 1/1991 | Saiki .................... 200/295 |
| 5,029,789 | 7/1991 | Nourry .................... 248/225.1 |

FOREIGN PATENT DOCUMENTS

| 593748 | 5/1959 | Italy .................... 361/809 |
| 5-90771 | 4/1993 | Japan . | |

OTHER PUBLICATIONS

Component Mounting Clip, Lovatt, IBM Tech Discl Bull. vol. 24 No 1A Jun. 1981, p. 226.

*Primary Examiner*—Gerald P. Tolin
*Attorney, Agent, or Firm*—Armstrong, Westerman, Hattori, McLeland & Naughton

[57] ABSTRACT

A structure for mounting a switch to a front panel of an electric apparatus. Supporting members are arranged on the front panel to support an elastic member which can hold the switch under the elastic deformation of the elastic member. One support member is arranged one side of the opening in the front panel and another support member is arranged on the opposite side of the opening. The elastic member includes a pair of longitudinal webs adapted to engage with the lateral flap portions of the switch and at least one transverse web connecting the longitudinal webs together. The elastic member has tongues for engaging with the support member.

14 Claims, 5 Drawing Sheets

STRUCTURE FOR MOUNTING SWITCH OR THE LIKE TO ELECTRIC APPARATUS

BACKGROUND OF THE INVENTION

1. Field of the Invention

The present invention relates to a structure for mounting an electric element, such as a switch, or the like, to an electric apparatus.

2. Description of the Related Art

Many electric/electronic apparatuses use many electric elements, such as switches, indicator lamps, resistors, timers and connectors, which are arranged in a casing or a cabinet of the apparatus. Some of the electric elements include manual operating parts or visible parts which are exposed to the outside of the front panel of the casing though openings in the casing. The front panel is intended to have a good feeling of the operation and a good appearance.

The switches, or the like, are usually secured to the inner surface of the front panel or wall of the casing, or the switches, or the like, are sometimes secured in the opening of the front panel of the casing, because such a mounting is advantageous in ensuring a good feeling of the operation and a good appearance of the apparatus.

Examples of conventional structures for mounting a switch to a casing are shown in FIGS. 9 to 12 in the attached drawings. In FIG. 9, a part of a switch 112 is inserted in an opening 114 of a wall or a front panel 110 of a casing of an electric apparatus and the switch 112 is secured to the front surface of the wall 110 by screws 116. In FIG. 10, the switch 112 is inserted in the opening 114 of the wall 110 and secured to the inner surface of the wall 110 by screws 116. These structures allow tile switch 112 to be reliably fixed, but involve an undesirable increase in labor or time for assembling the electric/electronic apparatus and for maintenance.

In FIG. 11, an example of a snap-fit type structure is shown in which the switch 112 has elastically deformable projections 123. The body of the switch 112 is inserted in the opening 114 of the wall 110 of the casing, as shown by the arrow, and the switch 112 is fixed to the wall 110 of the casing by a snap action of the elastically deformable projections 123 when the projections 123 pass through the opening 114. In this structure, the assembling work of the electric/electronic apparatus is facilitated, but the dismounting of the switch 112 from the wall 110 is somewhat difficult. In addition, the elastically deformable projections 123 may not exactly fit in the wall 110 due to the relationship of the projections 123 and the opening 114, so the switch 112 may be undesirably moved in the opening 114 of the wall 110 during use.

In FIG. 12, a further example is shown in which the switch 112 is arranged in the wall 110 and a manual operating part 133 of the switch 112 extends through the opening 114 of the wall 110. A boss 136 is arranged on the inner surface of the wall 110, and the switch 112 is secured to the wall 110 by an elastic strip 138 which is fastened to the boss 136 by a screw 137. Such a structure is disclosed, for example, in Japanese Unexamined Patent Publication (Kokai) No. 5-90771.

In this prior art, the elastic strip 138 is of a cantilevered structure and the switch-holding mechanism may change with a lapse of time so that the switch 112 may not be firmly held. Also, this structure involves an undesirable increase in labor or time for assembling the electric/electronic apparatus and for maintenance.

SUMMARY OF THE INVENTION

The object of the present invention is to provide a structure for mounting an electric apparatus to an electric/electronic apparatus, which can solve the above described problems and is a simple structure so that it can decrease labor or time for assembling the electric/electronic apparatus and for maintenance.

According to the present invention, there is provided a structure for mounting an electric element, such as a switch, to an electric apparatus, the structure comprising a casing of the electric apparatus, said casing having a wall with an opening to expose at least a portion of the electric element therethrough, a plurality of support members arranged on the wall of the casing near the opening, and an elastic member supported by the support members to hold the electric element by the elastic deformation of the elastic member.

The electric element can be easily mounted to the electric apparatus, by inserting a part of the electric element into the opening of the wall and attaching the elastic member to the support members while holding the electric element by the elastic member.

When it is desired to dismount the electric element from the electric apparatus for replacement or maintenance of the electric element or for maintenance of the other components, the electric element can be easily dismounted from the wall by removing the elastic member from the support members. According to the present invention, it is possible to easily mount the electric element, such as a switch, to the electric apparatus and to dismount the electric element from the electric apparatus. Also, it is possible to firmly hold the electric element with an appropriate cushioning function against an excessive external force during the use of the apparatus. Therefore, a change in the switch-holding mechanism may, with a lapse of time, be prevented. As a result, the electric element can be operated for a long time in a good condition and the electric apparatus can be maintained in a good operating condition.

Preferably, the wall of the casing has an inner surface, and the support members comprise projections standing on the inner surface of the wall, the projections having means to receive the elastic member. The support members in the form of the projections are formed in a generally L-shaped hook to receive the elastic member, or the projections have holes to receive the elastic member.

Preferably, one of the support members is arranged at a first position on one side of the opening and a further one of the support members is arranged at a second position on the opposite side of the opening. Therefore, the central portion of the elastic member can engage with the electric element to hold the latter.

The elastic member may be an elastic wire or an elastic strip. In the latter case, preferably, the electric element has a body portion and a pair of lateral flap portions on either side of the body portion, and the elastic member comprises a pair of longitudinal webs adapted to engage with the lateral flap portions and at least one transverse web connecting the longitudinal webs together.

Preferably, the at least one transverse web comprises a pair of transverse webs connecting said longitudinal webs so as to form an aperture in said elastic member to allow the body portion of the electric element to pass therethrough. In this case, preferably, a first tongue projects from one of the transverse webs into the aperture and a second tongue projects outwardly from the other of the transverse webs, the first and second tongues being fit in the support members. Preferably the second tongue is longer than the first tongue.

Preferably, the at least one transverse web comprises a transverse web connecting said longitudinal webs so as to form an aperture in said elastic member to allow the body portion of the electric element to pass therethrough. In this case, preferably, a first tongue projects from one of the transverse webs into the aperture and second tongues are formed at the ends of the longitudinal webs remote from the transverse web.

Preferably, the structure further comprises a handle arranged on the elastic member. Preferably, the structure further comprises at least one positioning means arranged in the wall of the casing and complimentary positioning means arranged in the electric element for positioning the electric element in position.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
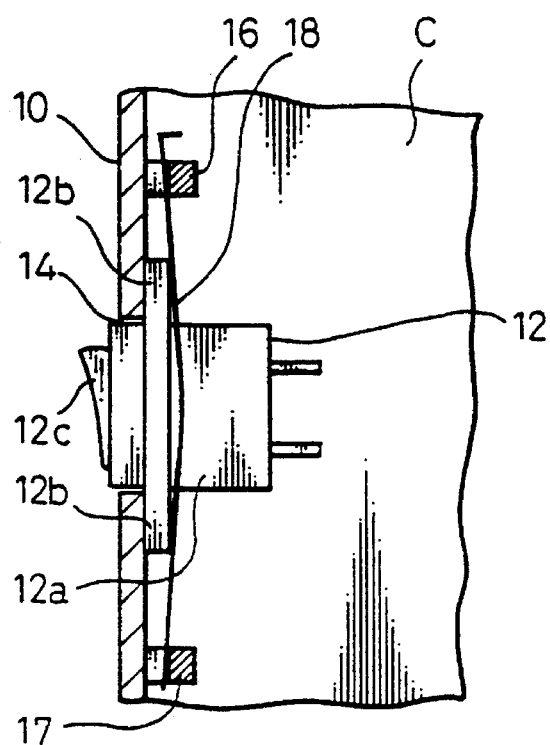
FIG. 1 is a cross-sectional view of a structure for mounting an electric element to an electric apparatus according to the first embodiment of the present invention.
Figure 2:
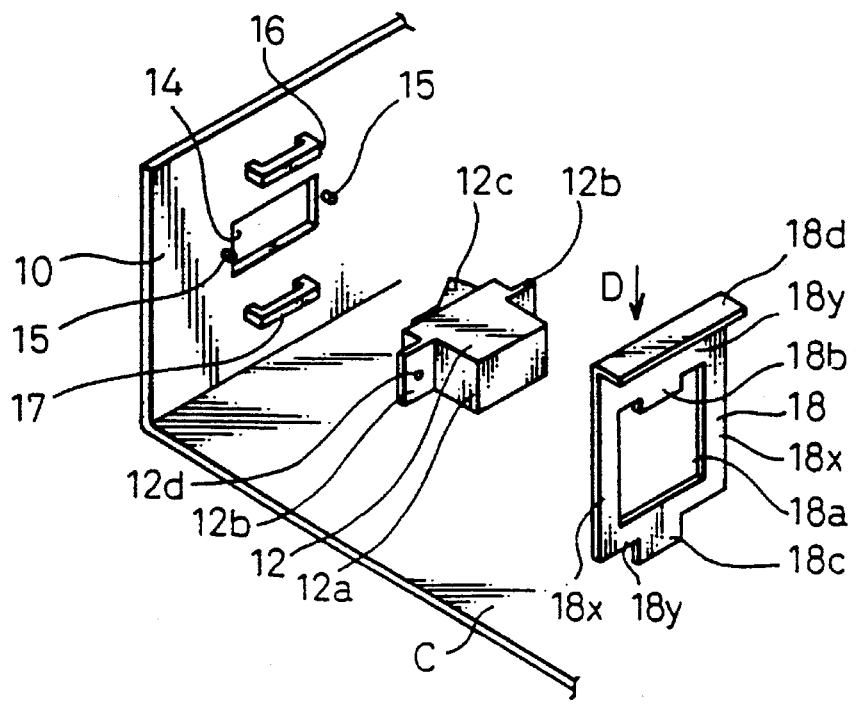
FIG. 2 is an exploded, perspective view of the structure of FIG. 1.
Figure 3:
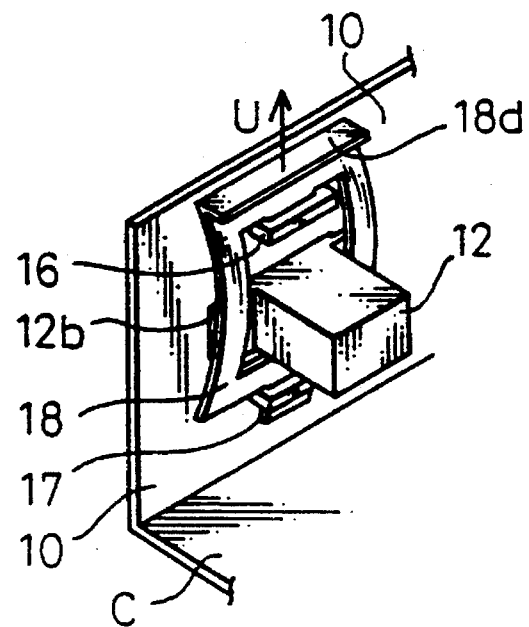
FIG. 3 is a perspective view of the structure of FIG. 2 in the assembled condition.

FIGS. 1 to 3 show the structure for mounting an electric element, such as a switch 12, to an electric/electronic apparatus. The electric apparatus includes a casing or cabinet C having a front panel or wall 10 with an opening 14 to expose at least a portion of the switch 12 therethrough. The wall 10 may have a plurality of openings 14 for many components (not shown). The switch 12 comprises a body portion 12a, lateral flap portions 12b, and a manually operating portion 12c. A portion of the body portion 12a including the manually operating portion 12c is inserted in the opening 14 until the lateral flap portions 12b rest against the inner surface of the wall 10.

A plurality of support members 16 and 17 are arranged on the wall 10 of the casing C near the opening 14. In this embodiment, two support members 16 and 17 are formed in the form of projections standing on the inner surface of the wall 10. One support member 16 is arranged at a first position on one side of the opening 14, i.e., above the opening 14 in the figures, and the other support member 17 is arranged at a second position on the opposite side of the opening 14, i.e., below the opening 14 in the figures. It is, of course, possible to arrange one support member 16 on the left side of the opening 14 and the other support member 17 on the right side of the opening 14.

An elastic member 18 is supported by the support members 16 and 17 to hold the switch 12 by the elastic deformation of the elastic member 18. The elastic member 18 can be formed from an elastic wire or an elastic strip, and the support members 16 and 17 have means to receive the elastic member 18. In this embodiment, each of the support members 16 and 17 is formed as projections and in a horizontally flattened U-shape which forms a hole therein to receive the end of the elastic member 18.

Figure 4:
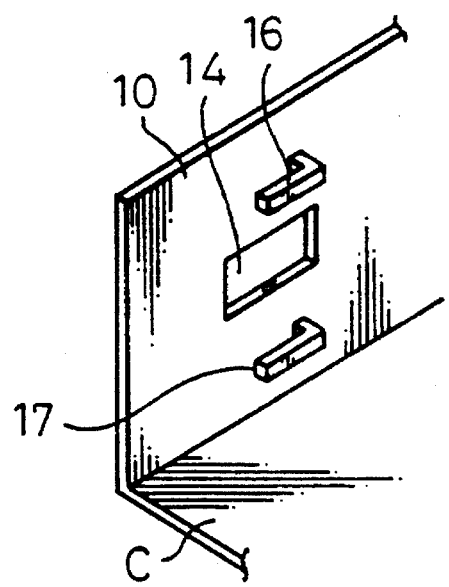
FIG. 4 is a perspective view of the modified structure.

FIG. 4 shows the modified mounting structure in which each of the support members 16 and 17 is formed in the form of the projections and in a generally L-shaped hook to receive the elastic member.

In FIGS. 1 to 3, the elastic member 18 comprises an elastic rectangular strip having an aperture 18a to allow the body portion 12a of the switch 12 to pass therethrough. The elastic member 18 comprises a pair of longitudinal webs 18x adapted to engage with the lateral flap portions 12b of the switch 12 and a pair of transverse webs 18y connecting the longitudinal webs 18x so as to form the aperture 18a.

A first tongue 18b projects from one of the transverse webs 18y into the aperture 18a and a second tongue 18c projects outwardly from the other transverse web 18y, so that the first and second tongues 18b and 18c are inserted in the support members 16 and 17. Preferably, the second tongue 18c is longer than the first tongue 18b. In addition, a handle 18d is arranged on the elastic member 18 near the first tongue 18b. Also, positioning projections 15 are arranged in the wall 10 of the casing near the opening 14 and complimentary positioning holes 12d are arranged in the lateral flap portion 12b of the switch 12 for positioning the switch 12 in position.

The switch 12 can be easily mounted to the electric apparatus. The elastic member 18 is first applied to the switch 12 so that the body portion 12a of the switch 12 is passed through the aperture 18a of the elastic member 18, and the switch 12 with the elastic member 18 is moved to the wall 10. The lower portion of the elastic member 18 is bent and the second tongue 18c of the elastic member 18 is slightly inserted in the lower support member 17, while a part of the switch 12 is inserted into the opening 14 of the wall 10. When the lateral flap portions 12b of the switch 12 rest against the wall 10, the handle 18d is pushed toward the wall 10 to bend the upper portion of the elastic member 18 and, thereafter, pulled down in the direction of the arrow D so that the first tongue 18b of the elastic member 18 is inserted in the upper support member 16.

In this instance, the second tongue 18c of the elastic member 18 is completely inserted in the lower support member 17 because the second tongue 18c is longer than the first tongue 18b, with the result that the switch 12 is more firmly secured to the electric apparatus.

The switch 12 can be easily dismounted from the electric apparatus, by pulling the handle 18d up, as shown by the arrow U in FIG. 3. The first and second tongues 18b and 18c of the elastic member 18 are thus removed from the upper and lower support members 16 and 17, and the elastic member 18 can be released from the support members 16 and 17. Thereafter, the switch 12 can be removed from the apparatus.

Figure 5:
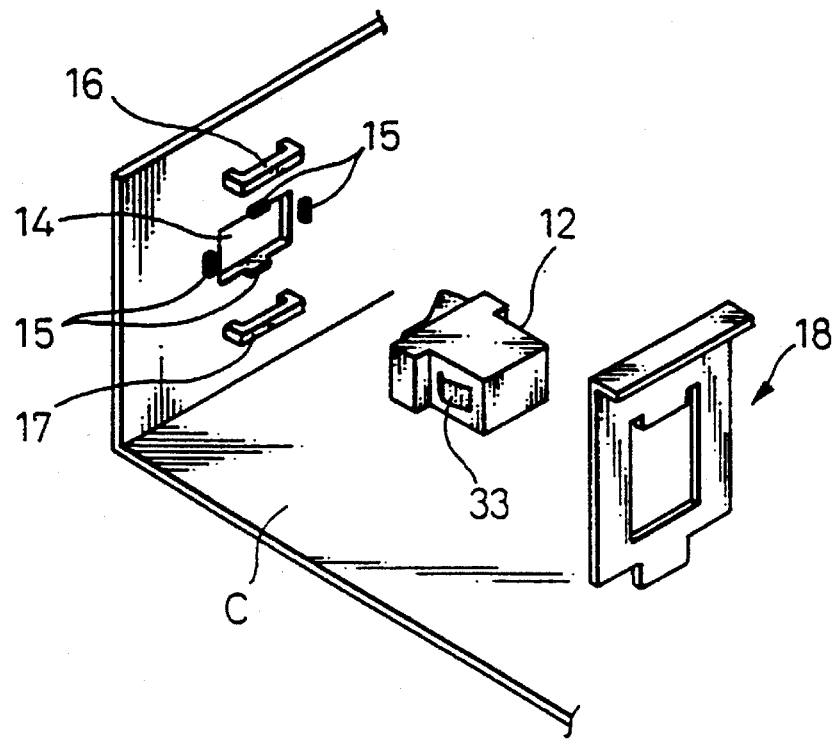
FIG. 5 is an exploded, perspective view of the structure according to the second embodiment of the present invention.
Figure 11:
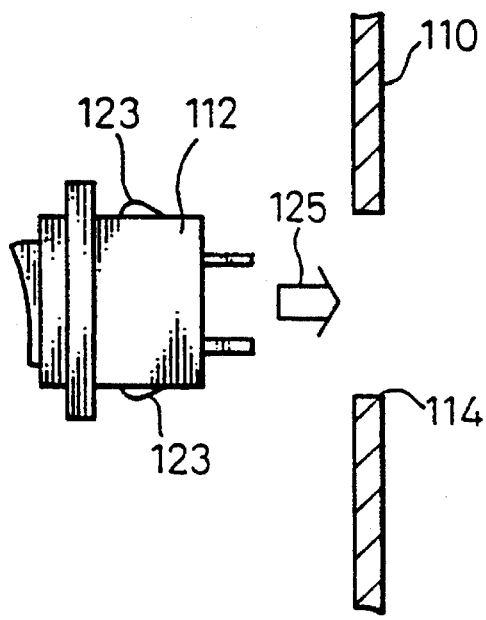
FIG. 11 is a view illustrating a further prior art.
Figure 12:
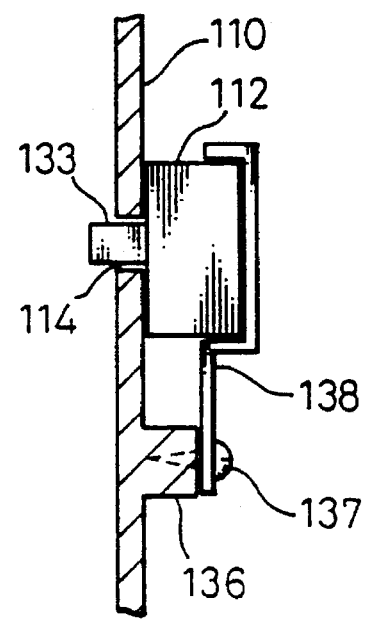
FIG. 12 is a view illustrating a further prior art.

FIG. 5 shows the second embodiment of the present invention. This embodiment is identical to the previous embodiment, except for the details of the switch 12. The switch 12 has elastically deformable projections 33 and can be used in a snap fit mounting, as described with reference to FIG. 11. According to the present invention, it is possible to use the switch 12 of the conventional design in this way.

Figure 6:
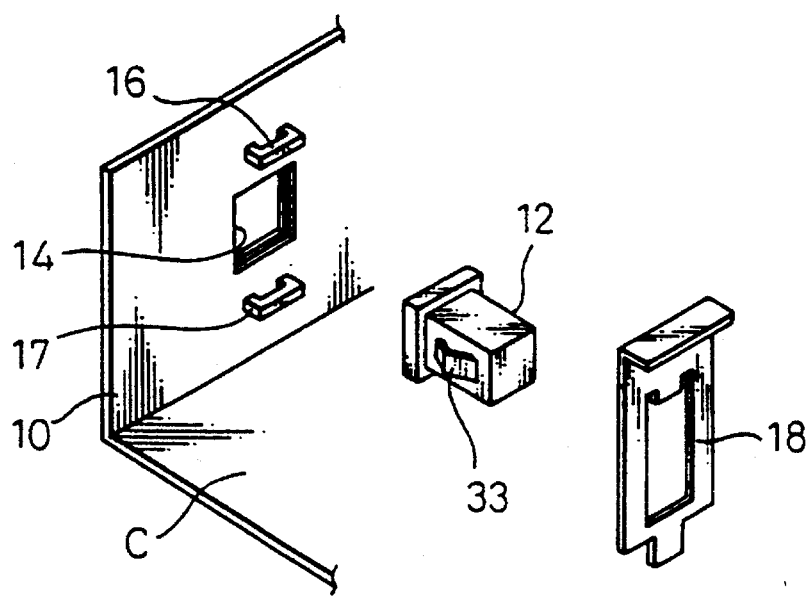
FIG. 6 is an exploded, perspective view of the modified structure.

FIG. 6 shows a modified mounting structure, in which the positioning projections 15 in the previous embodiments are omitted.

Figure 7:
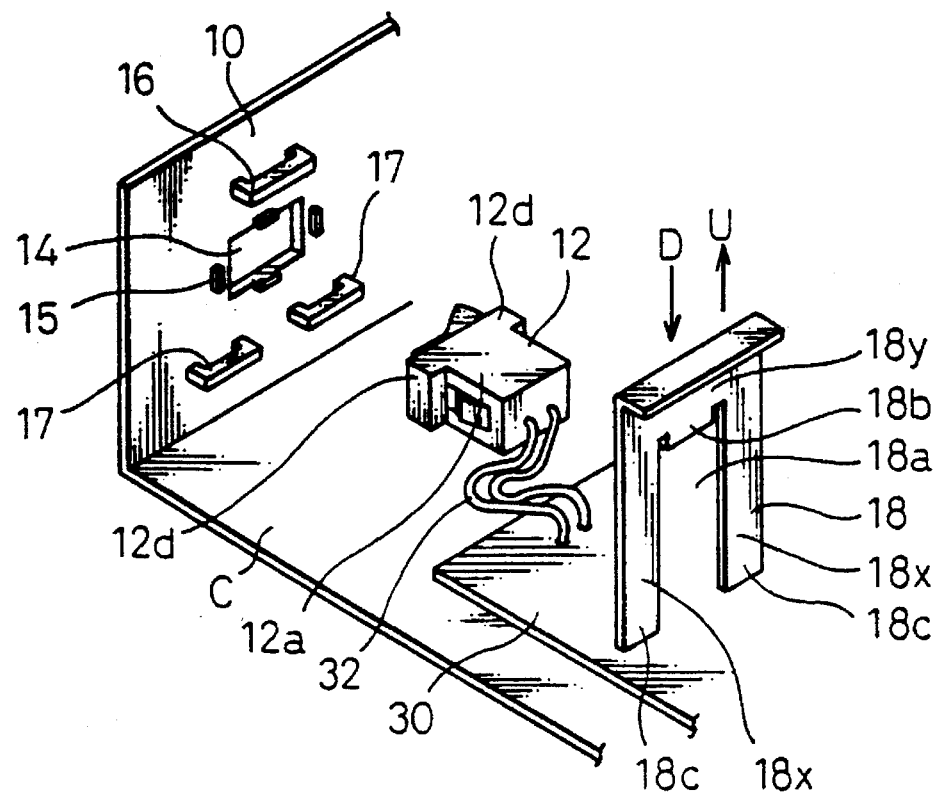
FIG. 7 is an exploded, perspective view of the structure according to the third embodiment of the present invention.
Figure 8:
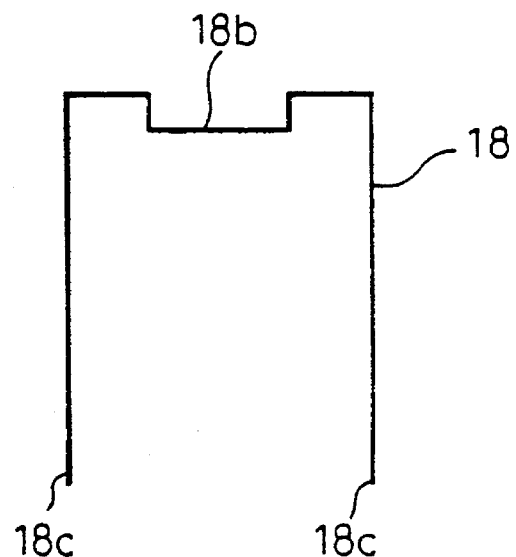
FIG. 8 is a diagrammatic view of the modified elastic member.
Figure 9:
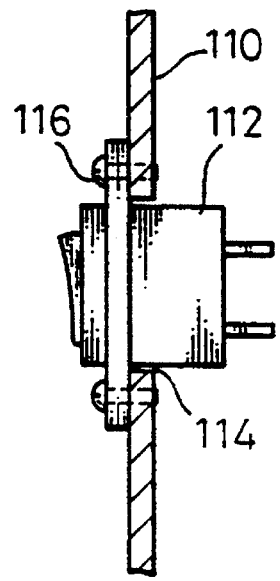
FIG. 9 is a view illustrating a prior art.
Figure 10:
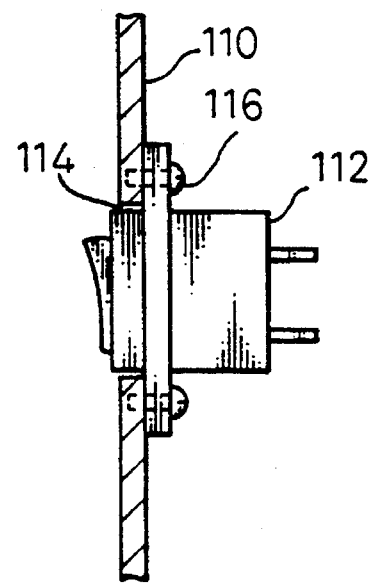
FIG. 10 is a view illustrating another prior art.

FIG. 7 shows the third embodiment of the present invention. This embodiment is also identical to the previous embodiments, except for the details of the elastic member 18. The elastic member 18 comprises a pair of longitudinal webs 18x adapted to engage with the lateral flap portions 12b of the switch 12 and a transverse web 18y connecting the longitudinal webs 18x so as to form the aperture 18a which is not completely surrounded.

A first tongue 18b projects from the transverse web 18y into the aperture 18a and second tongues 18c are formed at the ends of the longitudinal webs 18x remote from the transverse web 18y. Support members 16 and 17 are arranged in correspondence with the first and second tongues 18b and 18c.

The operation of this mounting structure is similar to the operation of the previous embodiments. In addition, it is possible to easily mount the switch 12 to the electric apparatus or easily dismount the switch 12 from the electric apparatus, even if the switch 12 is connected to a printed wiring board 30 by cables 32.

Figure shows the modified elastic member 18 which is made from an elastic wire and bent into a shape similar to the elastic member 18 of FIG. 7. Therefore, the modified elastic member 18 can be used in the above described manner. This modified elastic member 18 can be made by bending a wire and is thus very simple in construction., while the previously described elastic member 18 are made by pressing a sheet. Accordingly, it is possible to achieve the intended object and to reduce the cost by adequately selecting the material therefore and the diameter of the wire. In addition, this modified elastic member 18 will allow the compact design of the support members 16 and 17. It is also possible to make the elastic member 18 from a narrow plate instead of using a wire.

As explained, according to the mounting structure of the present invention, it is possible to decrease labor or time for assembling the electric/electronic apparatus and for maintenance.

I claim:

1. A structure mounting an electric element to an electric apparatus, said structure comprising:

an electric element having a body containing a flat mounting surface;

said electric apparatus including a casing having a wall containing a flat surface engaging the mounting surface of said body and an opening receiving said electric element and exposing at least a portion thereof through said opening;

a plurality of support members disposed on the wall surface of the casing on opposite sides of the opening; and a substantially straight elongated elastic member of substantially constant cross-section extending between, and being retained at opposite ends by, each of said support members, said elastic member, intermediate its ends, engaging said electric element to bias said mounting surface of said electric element against said surface of said casing wall by the elastic deformation of the elastic member.

2. A structure according to claim 1, wherein the support members comprise projections extending from the surface of the wall, the projections each having means to receive and end of the elastic member.

3. A structure according to claim 2, wherein the projections are each formed as a generally L-shaped hook to receive an end of the elastic member.

4. A structure according to claim 2, wherein the projections each have a hole to receive an end of the elastic member.

5. A structure according to claim wherein the elastic member comprises an elastic wire.

6. A structure according to claim 2, wherein the elastic member comprises an elastic strip.

7. A structure according to claim 6, wherein the electric element has a body portion and a pair of lateral flap portions on either side of the body portion containing said mounting surface, and the elastic member comprises a pair of longitudinal webs intermediate their ends that engage the respective lateral flap portions and at least one traverse web connecting the longitudinal webs together.

8. A structure according to claim 7, wherein the at least one traverse web comprises a pair of oppositely spaced transverse webs connecting said longitudinal webs so as to form an aperture in said elastic member with the body portion of the electric element passing therethrough.

9. A structure according to claim 8, wherein a first tongue projects from one of the transverse webs into the aperture and a second tongue projects outwardly from the other of the transverse webs, the first and second tongues being fit in the support members.

10. A structure according to claim 9, wherein the second tongue is longer than the first tongue.

11. A structure according to claim 7, wherein the at least one traverse web comprises a transverse web connecting said longitudinal webs to form a slot in said elastic member with the body portion of the electric element passing therethrough.

12. A structure according to claim 11, wherein a first tongue projects from the transverse web into the slot and second tongues are formed at the ends of the longitudinal webs remote from the transverse web.

13. A structure according to claim 1, further comprising a handle arranged on the elastic member.

14. A structure according to claim 1, further comprising at least one positioning means disposed in the wall of the casing and cooperating positioning means disposed on the electric element thereby positioning the electric element with respect to the opening in the wall of the casing.

* * * * *